United States Patent Office 3,374,765
Patented Mar. 26, 1968

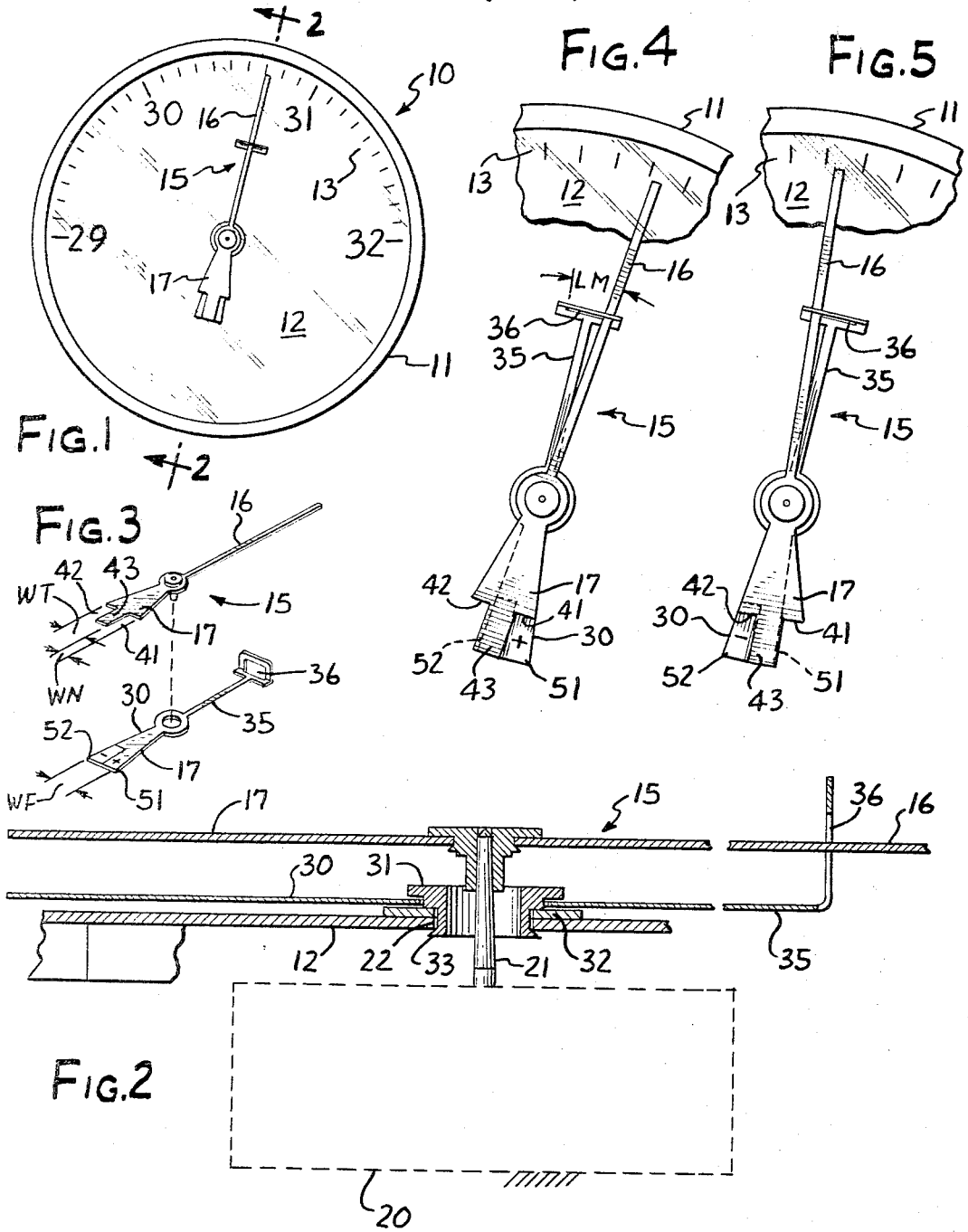

3,374,765
CHANGE INDICATOR FOR BAROMETER OR THE LIKE
Ralph H. Preiser, La Salle, Ill., assignor to General Time Corporation, Stamford, Conn., a corporation of Delaware
Filed Apr. 24, 1967, Ser. No. 633,063
1 Claim. (Cl. 116—129)

ABSTRACT OF THE DISCLOSURE

An indicating mechanism for a barometer or the like comprising an indicating hand having a tip portion and a tail portion, and a direction flag mounted on the dial under the indicating hand for indicating to the user the recent directon of movement of the hand. The direction flag is coupled to the indicating hand via a lost motion connection, and the tail portion thereof cooperates with notches in the tail portion of the indicating hand so that different corner areas of the flag are viewable in the notches at the respective limits of the lost motion, thereby providing an indication to the user of the recent direction of movement of the indicating hand. The tip portion of the flag is T-shaped, having a crossbar extending at right angles to the tip portion of the indicating hand, with a portion of the crossbar bent perpendicularly away from the dial. The bent portion of the crossbar has an elongated aperture, and the tip portion of the indicating hand is extended through said aperture to provide the lost motion connection.

---

This invention relates to a change indicator for the indicating hand of a barometer or the like which exposes a direction flag to indicate to the user the recent direction of movement of the hand.

It is an obect of the present invention to provide a change indicator in which a clear indication of change is provided promptly, with a minimum amount of lost motion. It is another object of the invention to provide a change indicator for the indicating hand of a barometer or the like in which the indication is unequivocal, with sufficient area of the direction flag being exposed to permit affixation of "plus" and "minus" symbols. It is thus an object to provide a change indicator which does not require any exercise of judgment to interpret the rising and falling conditions.

It is a further object to provide a change indicator which applies minimum drag upon the indicating hand and in which the accuracy of the reading is substantially unaffected by the presence of the direction flag.

Finally it is an object of the invention to provide a change indicator for a barometer which is of inherent low cost and which may be used in new or existing designs of barometers simply by a change in the hand configuration and without modification of the basic structure.

Other objects and advantages of the invention will become apparent upon reading the following detailed description and upon reference to the drawings in which:

FIGURE 1 is a simplified face view of a barometer employing the present invention;

FIG. 2 is a fragmentary transverse section taken along the line 2—2 of FIG. 1;

FIG. 3 is a perspective view of the indicating hand and its direction flag shown separated from one another;

FIG. 4 is an enlarged fragmentary view showing the indicating hand and direction flag upon an increase in barometric pressure;

FIG. 5 is a view similar to FIG. 4 but showing a falling barometer.

While the invention has been described in connection with a preferred embodiment, it will be understood that there is no intention to limit the invention to the particular embodiment shown but that it is intended, on the contrary, to cover the various modifications and alternative constructions included within the spirit and scope of the appended claims.

Referring to the drawing there is shown at 10 a barometer having a frame or housing 11 mounting a dial 12 which carries about its periphery a scale 13 in terms of atmospheric pressure. Cooperating with the scale is an indicating hand 15 having a tip portion 16 and a tail portion 17.

Within the barometer housing is a responsive mechanism 20 which may, for example, be of the well known aneroid type, having an output shaft 21 which extends through a clearance opening 22 in the dial 12.

For the purpose of indicating the recent direction of movement of the indicating hand, a direction flag is provided having a lost motion connection with the indicating hand and pivoted in the clearance opening at the center of the dial. In the present instance the direction flag indicated at 30 is loosely mounted upon a bushing 31 with the flag being spaced from the dial by means of a washer 32. The bushing may be staked or spun over on its underside as indicated at 33 so that the bushing, flag and washer are all captive with respect to the dial. The direction flag is coupled to the hand 15 by extending the flag to form a narrow tip 35 which is enlarged to form a window or clearance opening 36 through which the tip 16 of the indicating hand projects. The width of the window determines the amount of lost motion.

In accordance with the present invention the tail portion of the indicating hand has notches in the corner positions and the direction flag is of such width that the corners thereof are fully viewable in the notches at the respective limits of the lost motion thereby to give indication to the user of the recent direction of movement of the indicating hand. The space between the notches serves as a mask to shield the unwanted corner from view. Thus the tail portion 17 of the indicating hand has notches 41, 42 which, between them, define a mask 43 while the direction flag 17, which is preferably radially coextensive with the tail portion of the hand, is formed with corners 51, 52. The lost motion, indicated at LM in FIG. 4, is preferably such that the corners 51, 52 are fully viewable in the notches 41, 42 in the respective directions of movement of the indicating hand 15. Consequently, when the indicating hand is rising on the scale, with all of the lost motion taken up, the notch 41 will be completely "filled out" by the corner 51 of the direction flag, as shown in FIG. 4. The amount of exposed area is sufficient so that a legible "plus" sign may be placed upon the flag so as to be centered with respect to the notch. In the case of a falling barometer the notch 42 is completely occupied by the corner 52 of the flag and sufficient area is exposed to use an easily visible "minus" sign which, under such conditions, is centered within the notch 42 as shown in FIG. 5 to indicate a falling barometer.

More specifically with respect to the geometry of the construction, the width of the end of the flag, indicated at WF in FIG. 3, is made substantially equal to the width of the tail of the indicating hand, indicated at WT, minus the width of one of the notches, indicated at WN. Under such conditions, assuming that the range of lost motion is such as to enable full occupation of the notches, the "rising" and "falling" indications are mutually exclusive. That is to say, when one of the notches is occupied by the flag the opposite notch is completely clear, with the residual portion of the direction flag being hidden behind the mask portion 43 of the hand. Indeed, in the preferred embodiment the tail portion of the indicating hand is preferably divided in thirds, with the mask 43 having a width which is substantially equal to the notch width and with the width of the flag being substantially ⅔ of the width of the tail on the indicating hand. Such an arrangement permits a maximum of exposed flag area combined with complete masking of the residual portion of the flag, while at the same time providing minimum lost motion between the indicating hand and the flag. Thus a positive indication of direction is assured with a minimum change in barometric pressure.

It is one of the features of the present invention that the flag 30 is "poised" or balanced by the tip portion 35 so that the flag structure is in static balance unaffected by the force of gravity. Consequently the flag tends to remain in its existing position even though it is loosely pivoted on the hub 31 without necessity for providing any source of added friction, such as a friction washer, in the hub. The importance of this is that the flag exerts minimum drag upon the indicating hand 15 so that the accuracy of the indication is substantially unaffected by the presence of the flag. It is, of course, understood by one skilled in the art that in making a reading of any barometer it is desirable to tap the casing so that the indicating hand may "settle" at a precise indication of barometric pressure. Where the highest possible accuracy is desired, the present instrument may also be tapped which will serve to overcome the friction in the indicating hand system as well as any residual friction in the flag. However the significant fact is that notwithstanding the presence of the flag readings are achieved, even without tapping, which approach the order of accuracy of which the indicating system is capable.

It will be appreciated that the change indication has been brought about in the present construction at low cost and by means which are applicable to practically any barometer of conventional design, requiring only the substitution of the indicating hand of the described profile and the mounting of the flag, by a suitable bushing, in the clearance opening already provided in the instrument dial.

The notches employed in the present construction are open on two sides. However, it will be apparent to one skilled in the art that it is the visibility provided by the cutout portions which is the important feature; consequently, the term "notch" may, if desired, be construed to mean "window" without departing from the invention. Thus the term "fully viewable" has to do with the area exposed by the notches even though such area may not extend all the way to the end of the flag.

I claim:

1. In a barometer or the like the combination comprising a responsive mechanism having a shaft, a dial having a clearance opening for the shaft, an indicating hand on said shaft having a tip portion and a tail portion, a direction flag mounted on said dial under the tail portion of said indicating hand and pivoted coaxially with the shaft, said flag having a substantially T-shaped tip portion with the crossbar of the T extending at substantially right angles to the indicating hand and bent perpendicularly away from said dial, the bent portion of said crossbar forming an aperture elongated transversely to the axis of the indicating hand with the tip portion of the indicating hand extending through the elongated aperture to provide a lost motion connection between the indicating hand and the direction flag, the tail portion having notches in the corner positions of predetermined arcuate width, the direction flag being generally coextensive with the tail portion in the radial direction and having a width which is substantially equal to the width of the tail portion minus the notch width, the lost motion being such as to maintain the direction flag substantially within the confines of the tail portion so that the corners on the direction flag are visible in the notches in the respectively opposite directions of movement of the indicating hand for indication of the recent direction of movement of the hand.

References Cited

UNITED STATES PATENTS

| | | | |
|---|---|---|---|
| 963,147 | 7/1910 | Haskins | 116—129 |
| 1,734,183 | 11/1929 | Shore | 116—136.5 |
| 1,995,436 | 3/1935 | Schofield | 73—386 |
| 2,007,680 | 7/1935 | Hanscom | 116—129 |
| 2,289,120 | 7/1942 | House | 116—129 |
| 2,425,941 | 1/1947 | Kahn | 116—129 |

LOUIS J. CAPOZI, *Primary Examiner.*